US011605134B2

(12) United States Patent
Cohen et al.

(10) Patent No.: US 11,605,134 B2
(45) Date of Patent: Mar. 14, 2023

(54) SELF-OPTIMIZING, MULTI-CHANNEL, COGNITIVE VIRTUAL BENEFITS PRODUCT FIELD UNDERWRITER AND CUSTOMER SERVICE REPRESENTATIVE

(71) Applicant: PATTY, LLC, Deerfield Beach, FL (US)

(72) Inventors: Seth Cohen, Lighthouse, FL (US); Luis Silvestre, Miramar, FL (US)

(73) Assignee: PATTY, LLC, Deerfield Beach, FL (US)

( * ) Notice: Subject to any disclaimer, the term of this patent is extended or adjusted under 35 U.S.C. 154(b) by 0 days.

(21) Appl. No.: 16/983,895

(22) Filed: Aug. 3, 2020

(65) Prior Publication Data

US 2021/0042840 A1 Feb. 11, 2021

Related U.S. Application Data

(60) Provisional application No. 62/943,912, filed on Dec. 5, 2019, provisional application No. 62/937,863, filed on Nov. 20, 2019, provisional application No. 62/886,393, filed on Aug. 14, 2019, provisional application No. 62/881,706, filed on Aug. 1, 2019.

(51) Int. Cl.
*G06Q 40/08* (2012.01)
*G06F 40/30* (2020.01)
*G06F 3/16* (2006.01)

(52) U.S. Cl.
CPC ............. *G06Q 40/08* (2013.01); *G06F 3/167* (2013.01); *G06F 40/30* (2020.01)

(58) Field of Classification Search
CPC .................................................... G06Q 40/08
See application file for complete search history.

(56) References Cited

U.S. PATENT DOCUMENTS

| 6,684,196 | B1* | 1/2004 | Mini | G06Q 30/0641 |
| | | | | 705/37 |
| 8,793,147 | B2 | 7/2014 | Bradshaw et al. | |
| 9,495,700 | B2 | 11/2016 | Hoch et al. | |
| 9,812,151 | B1 | 11/2017 | Amini et al. | |
| 9,996,881 | B2 | 6/2018 | Mdeway | |
| 10,295,356 | B1* | 5/2019 | Cope | G01C 21/3694 |

(Continued)

FOREIGN PATENT DOCUMENTS

| KR | 20190051904 | 5/2019 |
| KR | 20190065840 | 6/2019 |
| WO | 20190048941 A1 | 3/2019 |

OTHER PUBLICATIONS

International Search Report PCT/US20/44778, dated Oct. 21, 2020.

*Primary Examiner* — Scott C Anderson
(74) *Attorney, Agent, or Firm* — Porzio Bromberg & Newman P.C.

(57) ABSTRACT

An anthropomorphic, artificial intelligence-based system and method to provide benefits products field underwriting and post-enrollment customer services through a cognitive virtual assistant. The system can contact to one or more third-party benefits provider systems to obtain coverage details, provider types and location details, and to modify member coverage types on behalf of the member. The system can contact third-party pharmacy systems to fill medical prescriptions. The system can contact third-party medical services for providing information directed to medical services.

17 Claims, 9 Drawing Sheets

(56) References Cited

U.S. PATENT DOCUMENTS

| | | | |
|---|---|---|---|
| 10,296,982 B1* | 5/2019 | Bernico | G16H 30/40 |
| 10,395,318 B2* | 8/2019 | Russo | G06Q 40/08 |
| 10,832,345 B1* | 11/2020 | Santos | G06V 10/751 |
| 2002/0169702 A1 | 11/2002 | Eaton et al. | |
| 2009/0257566 A1* | 10/2009 | Dixon | H04M 3/4285 |
| | | | 379/88.04 |
| 2010/0070307 A1 | 3/2010 | Sinvhal-Sharma | |
| 2011/0213625 A1* | 9/2011 | Joao | G16H 20/40 |
| | | | 705/2 |
| 2016/0098298 A1* | 4/2016 | Trefler | G06F 9/5027 |
| | | | 718/104 |
| 2017/0161758 A1 | 6/2017 | Towriss | |
| 2018/0165586 A1* | 6/2018 | Saxena | G06N 20/20 |
| 2018/0204111 A1 | 7/2018 | Zadeh et al. | |
| 2019/0035040 A1 | 1/2019 | Goel | |
| 2019/0095582 A1 | 3/2019 | Waits | |
| 2019/0171351 A1 | 6/2019 | Kilchenko et al. | |

\* cited by examiner

10

11 - Initiating a session through an interface with a cognitive digital assistant 12 - Cognitive virtual assistant prompts the user to answer a series of preliminary questions 13 - Adjust parameters of the cognitive virtual assistant to accommodate the user 14 - Cognitive digital assistant prompt engages in conversation with a user for underwriter requirements information for a benefits product and receives user's description 15 - User's responses stored

31 - Initiating a session through an interface with a virtual assistant

32 - Virtual assistant prompts the user to answer a series of pre-qualifying questions

33 - Adjust parameters of the virtual assistant to accommodate the user

34 - Virtual assistant prompts user for information and receives user's description

35 - Evaluates the user's level of intent or urgency to benefits products

36 - Identify and present relevant benefits products based on eligibility determined by responses from the user

37 - Scan network scan a network of live agents licensed or registered in a resident state of a user to identify an agent offering benefits products presented to the user during the session of benefits producers

14 - Cognitive digital assistant engages in conversation with a user for underwriter requirements information and receives user's description

211 - Initiating a session through an interface with a cognitive digital assistant 212 - Cognitive virtual assistant prompts the user to answer a series of preliminary questions directed to a requested service 213 - Adjust parameters of the cognitive virtual assistant to accommodate the user 214 - Cognitive digital assistant prompt engages in conversation with a user for information and receives user's description 215 - User's responses stored 216 - Identify and present relevant benefits products of one or more third-party benefits providers

FIG. 3A

SELF-OPTIMIZING, MULTI-CHANNEL, COGNITIVE VIRTUAL BENEFITS PRODUCT FIELD UNDERWRITER AND CUSTOMER SERVICE REPRESENTATIVE

BACKGROUND OF THE INVENTION

Field of the Invention

The present invention relates to an anthropomorphic, artificial intelligence-based system and method to assist during an underwriting process to enable a consumer to purchase life and health insurance, or benefits products and services (hereinafter "benefits products") from an insurance benefits provider, benefits company, healthcare discount plan provider, health care sharing ministry, third-party administrator, or similar entities (hereinafter "benefits provider(s)") and to provide post-enrollment customer services through a cognitive virtual process via phone, mobile device, tablet, app, SMS, chat, iMessage, videoconference, or virtual reality (hereinafter "method(s) of communication").

Description of the Related Art

Consumers of benefits products commonly use comparison shopping internet websites to research and compare available options. benefits products comparison shopping websites attempt to guide consumers through intricate product variations from multiple benefits providers. The consumer often struggles to identify adequate affordable coverage and plan options in the marketplace due to a disarray of benefits products ranging from various types (on-exchange, off-exchange, limited indemnity medical, short term medical, ministry, cost sharing), levels of coverage (Platinum, Gold, Silver, Bronze at the federal level), premiums, co-pays, membership fees, deductibles, and limitations. A state of asymmetric information for products across the individual marketplace exists and potentially leads the consumer to adverse selection. In addition, it is often difficult for the consumer to easily understand underwriter requirements and supply required information to the underwriter in order to obtain a benefits product.

Due to the nature of the chaotic environment, the individual marketplace is also an outlet for fraudulent benefits products. In many cases, consumers seek the assistance of a licensed insurance agent, producer or broker (hereinafter "agent") to select a benefits product. It is common in the individual marketplace for a consumer to speak with an agent by phone to review available benefits product options and complete the benefits provider's enrollment process. The agent typically enters the consumer's underwriting details into a rate quoting calculator or web form to obtain rates, explains the differences between plan options from various benefits providers, and transcribes the enrollment details onto the Benefits Provider's application or enrollment portal on behalf of the consumer.

In many cases, the agent is appointed to represent a limited number of benefits providers thus limiting the consumer's choices to only plans offered by those benefits providers. Compensation arrangements for agents also typically include commissions (a percentage of premium as paid by the benefits provider) or another form of compensation (e.g., marketing fees). Agent bias, thus, is also potentially a significant factor in adverse selection.

Conventional systems have been used for extracting user data to identify available insurance plans based on responses from the consumer. U.S. Pat. No. 9,495,700 describes the use of branded virtual characters on a server computer which are accessed by an employee at a remote client computer over a network in order to engage and educate users regarding alternate benefit plans. Throughout the process, the system employs a portfolio-driven approach to identify inter-dependencies among different benefit products and plans and prioritize and recommend "portfolio-level" benefit solutions. The employee can be automatically enrolled in the selected benefit plan. This system has the drawback of needing a computer interface to access the system over the internet and can be cumbersome for a person to navigate, especially the elderly or unsophisticated computer users.

It is desirable to provide an unbiased, anthropomorphic, artificial intelligence-based telephonic system and method to assist in providing underwriter requirements, identify the consumer's available coverage options based on eligibility, assist in the comparison of different options, automatically enroll the consumer into selected plans based on the provided underwriting, as well as to provide post-enrollment customer services such as identifying and modifying benefits product coverage details and to interface with covered service providers such as pharmacies and physicians.

SUMMARY OF THE INVENTION

The present invention relates to an anthropomorphic, artificial intelligence-based system and method to provide benefits product field underwriting and post-enrollment customer services through a cognitive virtual process via a chosen method of communication. In one embodiment, the present invention can automate the tasks of a field underwriter of a benefits provider or the invention can provide a customer service session as initiated by either a member, insured, or policyholder (hereinafter "member") or initiated by the system.

In one embodiment, an underwriting session is initiated by the system via a chosen method of communication. The user can be either the proposed member (hereinafter "applicant") or a system. For a voice session, audio interfaces of the system allow multi-language, bi-directional, speech-based conversations between the cognitive virtual assistant and the user. As the user speaks to the cognitive virtual assistant, a process of automated speech recognition (ASR) can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system can include an episodic memory to allow the cognitive virtual assistant to recall details from previous segments of the current conversation or previous conversations altogether. The cognitive virtual assistant can be implemented in a conversational manner for receiving information from a user and generating responses using cognitive learning abilities during the conversation. The cognitive learning abilities of the cognitive virtual assistant can also include analytic memory for understanding trend of data, affective memory for understanding emotion and deep back projection networks (DBPN) for learning process flows via empirical learning. The cognitive virtual assistant can be considered to be a "trusted" virtual underwriter as compared to a human prone to error or bias.

In one embodiment, once a session is initiated, the user is introduced to the cognitive virtual assistant trained to provide information to satisfy requirements noted by the benefits provider during the application underwriting process. It is typical in benefits product underwriting for a benefits provider to require additional information from the applicant following the submission of an application for the selected benefits product. Requirements may include, but are not limited to, medical records, laboratory results, prescribed medications, chronic conditions, family medical history, drug use, and the like.

In one embodiment, a session is initiated to generate rate quotes and compare available coverage options. In another embodiment, after the underwriting requirements are satisfied, the cognitive assistant can guide the user to complete the application process in order to enroll the applicant into selected plans available from various benefits providers. The cognitive virtual assistant follows a roadmap embedded in a semantic memory for guiding the user through the session. It allows the cognitive virtual assistant to engage in social conversation with the user while focusing the conversation to insurance underwriting requirements, rate quoting, comparison shopping, and enrollment topics and processes.

The cognitive virtual assistant can prompt the user to answer a series of questions directed to underwriting requirements for a selected benefits product proposal. In one embodiment, the cognitive virtual assistant can also prompt the user to answer a series of pre-qualifying questions to determine available coverage options. In one embodiment, in order to generate a quote of an individual to list rates and details for coverage options for an applicant, the virtual cognitive assistant can request the following information from the user: date of birth, zip code and gender.

Responses from the user are stored in the memory of the system. The system can invoke an application programming interface (API) to call to one or more third-party benefits providers to obtain pending underwriting requirements and record responses from the applicant to advance the underwriting process. Responses from the one or more benefits provider's underwriting servers can contain underwriting requirements, including, for example, medical records, laboratory results, prescribed medications, chronic conditions, family medical history, drug use and limitations. The cognitive virtual assistant can review the received responses and relay the received responses or a subset of the received responses to the user by various methods of communication at the user's preference.

In addition to the underwriting requirements, the system can also invoke an API call to one or more third-party benefits provider application servers to obtain benefits product application requirements for the selected coverage options. The cognitive virtual assistant prompts the user to provide information directed to the application requirements for the selected coverage option. Responses from the user can be stored in memory while collecting information from the user for each data field required on the application for the selected coverage option. Upon satisfaction of the application requirements and underwriting requirements for the selected coverage options, the system invokes an API call to one or more third-party benefits provider enrollment servers corresponding to the one or more third-party benefits provider application servers to submit the application and obtain a policy identification (ID). It will be appreciated that in some embodiments the third-party benefits provider application server can be the same server as the third-party benefits provider enrollment server. The response from the third-party benefits provider enrollment server can contain additional fulfillment material from the benefits provider for the user to be covered. The system can relay the additional fulfillment material to the user by various methods of communication at the user's preference. The cognitive virtual assistant can also present relevant cross-sell opportunities to the user.

In one embodiment, the system can also invoke an application programming interface (API) to contact to one or more third-party benefits provider rate quoting servers before the underwriting process to obtain available coverage options from benefits providers for the quoted applicant. Responses from the one or more benefits provider rate quoting servers can contain rate quoting details, including, for example, plan descriptions, premiums and limitations. The cognitive virtual assistant can review the received responses and relay the received responses or a subset of the received responses to the user by various methods of communication at the user's preference. The system can utilize underwriting guidelines from benefits providers together with user stated preferences, eligibility and affordability to sort and highlight recommended coverage options to the user. The user can select one or more plans from the coverage options and proceed to underwriting, enrollment/policy issuance. The one or more plans can be selected by specifying the one or more plan names or unique identifiers to the cognitive virtual assistant. The system can provide security of the user interface and transmitted data. In one embodiment, data encryption can be used during transport of data.

In one embodiment, the system and method can automate the tasks of a customer service representative of a benefits provider or a third-party administrator (TPA) working on behalf of benefits provider is provided. A customer service session can be initiated by either a m ember or by the system via a chosen method of communication. For a voice session, audio interfaces of the system allow multi-language, bi-directional, speech-based conversations between the cognitive virtual assistant and the user. As the user speaks to the cognitive virtual assistant, a process of automated speech recognition (ASR) can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the cognitive virtual assistant to recall details from previous segments of the current conversation or previous conversations altogether. The cognitive virtual assistant can be implemented in a conversational manner for receiving information from a user and generating responses using cognitive learning abilities during the conversation. The cognitive learning abilities of the cognitive virtual assistant can also include analytic memory for understanding trend of data, affective memory for understanding emotion and deep back projection networks (DBPN) for learning process flows via empirical learning. The cognitive virtual assistant can be considered to be a "trusted" virtual service representative.

Once a session is initiated, the member is introduced to a human-like interface, a cognitive virtual assistant. The cognitive virtual assistant greets and prompts the member to request services in a natural language including, but not limited to, providing proof of coverage to providers, reviewing coverage details, modifying coverages, locating a provider, scheduling physician office visits, requesting prescription drug refills, and reviewing and modifying payment details. The cognitive virtual assistant can also initiate a videoconferencing, voice, chat or text session with a medical provider.

As the session between the member and cognitive virtual assistant progresses, the system utilizes tone analysis technologies including Sentiment Analysis, Tone Analyzer, and Personality Insights to adjust the language and tone of the cognitive virtual assistant to accommodate the member. The system can invoke an application programming interface (API) to contact to one or more third-party benefits provider systems to obtain coverage details, provider types and location details, and to modify member coverage types on behalf of the member. The system can utilize third-party pharmacy systems via an application programming interface (API) to fill medical prescriptions on behalf of the member at the preferred retail pharmacy location. The system can also utilize a third-party service for conferencing members with on-call physicians or healthcare providers for non-emergency medical related concerns.

The system can provide security of the user interface and transmitted data. In one embodiment, data encryption can be used during transport of data.

The invention will be more fully described by reference to the following drawings.

BRIEF DESCRIPTION OF THE DRAWINGS

FIGS. 1A-1C are flow diagrams of one embodiment of a method for interactively providing underwriter services for relevant benefits products based on eligibility to a user and enrolling of the user with determined benefits products and optionally pre-qualifying a consumer for benefits products performed by a system of the present invention.

FIGS. 3A-3D are flow diagrams of one embodiment of a method for presenting benefits products customer services to a user performed by a system of the present invention.

DETAILED DESCRIPTION

Figure 1B:
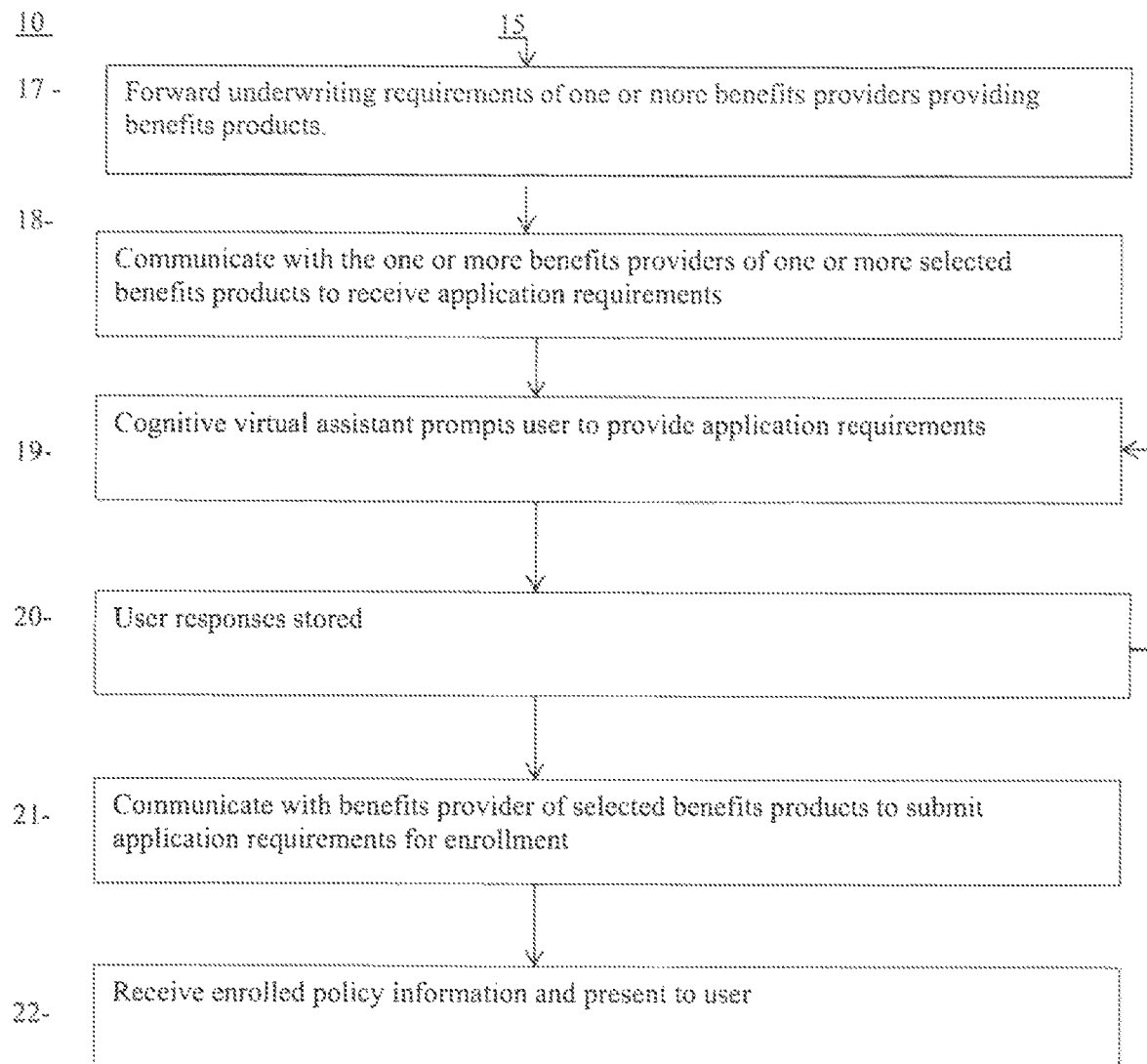

Reference will now be made in greater detail to a preferred embodiment of the invention, an example of which is illustrated in the accompanying drawings. Wherever possible, the same reference numerals will be used throughout the drawings and the description to refer to the same or like parts.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

FIGS. 1A-1B are flow diagrams of an embodiment of interactive method 10 for interactively providing underwriter services for relevant benefits products based on eligibility to a user and enrolling of the user with determined benefits products. In step 11, a session with a cognitive virtual assistant is initiated through an interface. The user can be a buyer or consumer. For example, the user can initiate the session with the system using an interface of various Methods of Communication. Once a session is initiated, in step 11, the user is introduced to a cognitive virtual assistant. The cognitive virtual assistant can greet and prompt the user to answer a series of preliminary questions in step 12. In one embodiment, the system can internalize the user's answers and not repeat questions which limits buyer or consumer frustration. For a voice session, an audio interface of the system allows multi-language, bi-directional, speech-based conversations between the cognitive virtual assistant and the user. As the user speaks to the cognitive virtual assistant, a process of automated speech recognition (ASR) can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the assistant to recall details from previous segments of the current conversation or previous conversations altogether. The cognitive virtual assistant can be implemented in a conversational manner for receiving information from a user and generating responses using cognitive learning abilities during the conversation. In one embodiment, the cognitive virtual assistant presents audio to the user and receives audio from the user. The cognitive virtual assistant is artificial intelligence based to receive voice via an audio interface which is transferred to a server to be interpreted with artificial intelligence in real time. Responses from the server can be sent back via audio to the user's audio interface.

In step 13, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including, for example, Sentiment Analysis, Tone Analyzer and Personality Insights to adjust parameters of the cognitive virtual assistant.

In step 14, the cognitive virtual assistant engages in a conversation to prompt the user to provide information directed to underwriting requirements for a proposed benefits product in real time. In one embodiment, the cognitive virtual assistant can request information directed to one or more of medical records, laboratory results, prescribed medications, chronic conditions, family medical history, and drug use. In step 15, responses from the user are stored in memory of the system. Step 14 and step 15 can be repeated for collecting additional information from the user directed to underwriting requirements.

In one embodiment, the system can invoke an application programming interface (API) to contact to one or more benefits provider and third-Party administrator underwriting servers to obtain underwriting requirements and underwriting guidelines for an Applicant. The cognitive virtual assistant can review the received responses of the third-party benefits provider underwriting servers and present the received responses or a subset of the received responses to the user by various methods of communication at the user's preference.

In step 17, the user's responses for underwriting requirements are forwarded to one or more benefits providers providing benefits products. In step 18, the system can communicate with the one or more benefits providers of one or more selected benefits products to receive application requirements. In one embodiment, the system can invoke an application programming interface (API) to contact to one or more benefits provider application servers to obtain application requirements for the selected coverage options.

In step 19, the cognitive virtual assistant prompts the user to provide information directed to the application requirements for the selected coverage option. In step 20, responses from the user can be stored in memory. Step 19 and step 20 can be repeated for collecting information from the user for each data field required on the application for the selected coverage option. The system can review the collected information to ensure that application requirements for the selected coverage options are satisfied. If the application requirements are not satisfied, steps 19 and 20 can be repeated.

In step 21, the system communicates with one or more benefits providers of selected benefits products to submit application requirements for enrollment. In one embodiment, the system invokes an application programming interface (API) to contact one or more benefits providers enrollment servers corresponding to the one or more benefits provider application servers to submit the application and obtain a policy ID. In step 22, the system receives enrolled policy information and presents the received information to the user. The response from the benefits provider enrollment server can contain additional fulfillment material from the benefits provider. The system can relay the additional fulfillment material to the user by various methods of communication which are selected by the user. The received policy information can be presented to the user by the cognitive virtual assistant.

FIG. 1C is a flow diagram for an embodiment of interactively presenting relevant benefits products based on eligibility to a user. In step 31, a session with the cognitive virtual assistant is initiated. The cognitive virtual assistant can greet and prompt the user to answer a series of pre-qualifying questions in step 32. In one embodiment, the system can internalize the user's answers and not repeat questions which limits buyer or consumer frustration. The cognitive virtual assistant presents audio to the user and receives audio from the user. The cognitive virtual assistant is artificial intelligence based to receive voice via an audio interface which is transferred to a server to be interpreted with artificial intelligence. Responses from the server can be sent back via audio to the user's audio interface.

In step 33, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including, for example, Sentiment Analysis, Tone Analyzer, and Personality Insights to adjust parameters of the cognitive virtual assistant.

In step 34, the cognitive virtual assistant prompts the user to describe the benefits products that are of interest to the user for purchase. In step 35, the system can evaluate the user's level of intent or urgency to purchase the benefits product. In step 36, the system can identify and present relevant benefits products based on eligibility determined by responses from the user presented to the cognitive virtual assistant. In one embodiment, the cognitive virtual assistant can utilize benefits provider rate quoting services and benefits provider underwriting guidelines and requirements from multiple benefits providers to identify and present relevant benefits products through the cognitive virtual assistant to the user.

In step 37, the cognitive virtual assistant can scan a network of live agents licensed or registered in a resident state of a user to identify an agent offering benefits products presented to the user during the session. The cognitive virtual assistant can transfer the buyer or consumer to proceed with enrollment by beginning at step 14 for the cognitive virtual assistant to engage in conversation with a user for underwriter requirements information for a selected benefits provider and receives a description of the requirements information from the user. Previously described steps 15-22 can be implemented to assist with completing enrollment of the user.

Figure 2:
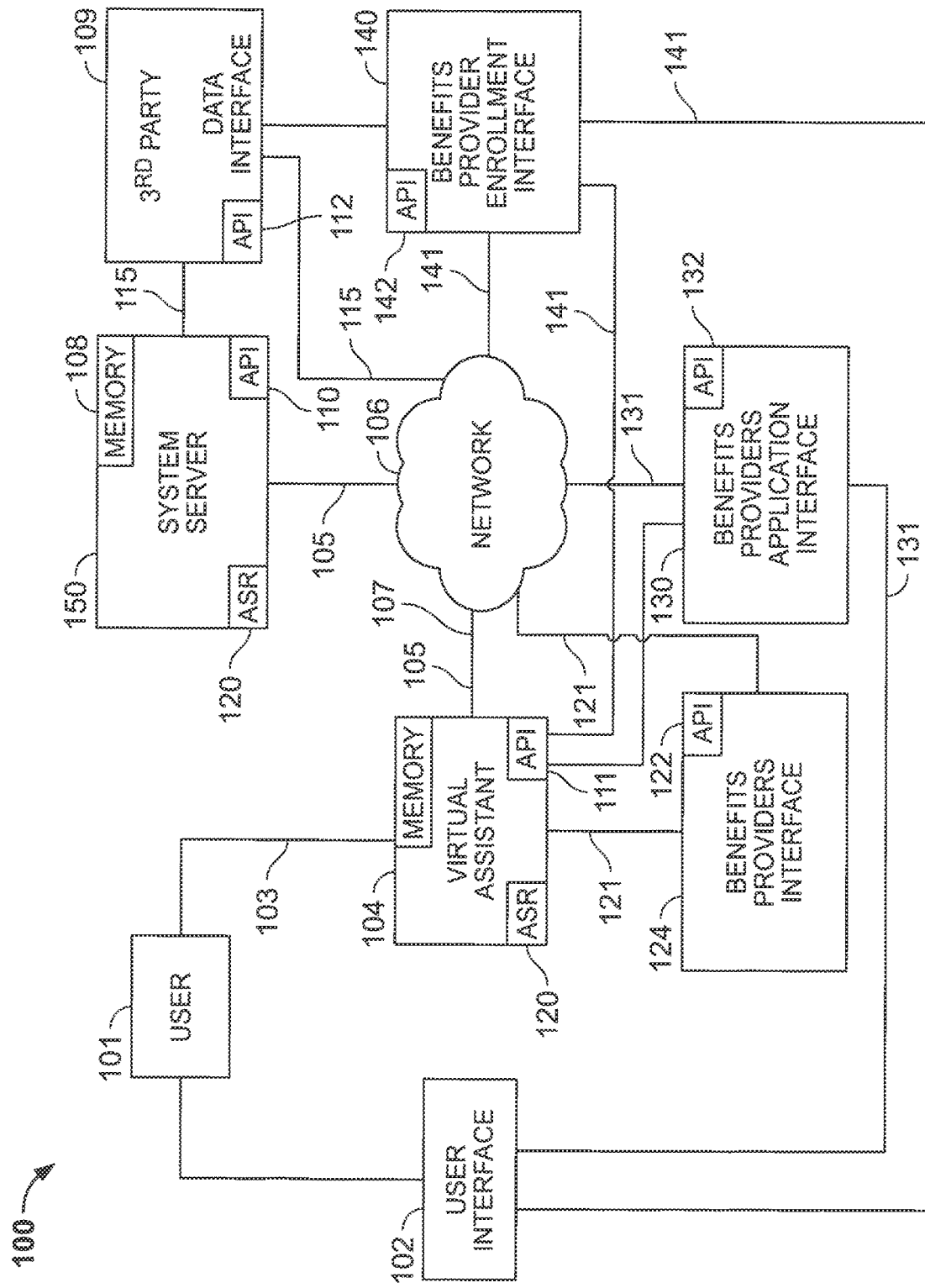
FIG. 2 is a block diagram of an embodiment of an artificial intelligence-based multi-channel system of the present invention for performing FIGS. 1A-1C.

FIG. 2 is a schematic diagram of an implementation of system 100. System 100 includes user interface 102 which is accessed by user 101. User interface 102 can be an electronic device such as a mobile telephony device including for example a mobile device, cell phone or smartphone. User interface 102 can include various Methods of Communication including SMS, chat, email, mobile app, or Messenger. Mobile telephony devices can communicate with fourth generation (4G) or fifth generation (5G) cellular communications. It will be appreciated that other mobile telephony devices and networks can be used in accordance with the teachings of the present invention. User interface 102 communicates audio or digital information to the cognitive virtual assistant 104 over communication path 103.

Cognitive virtual assistant 104 can be a component which is artificial intelligence based. In one embodiment, cognitive virtual assistant 104 receives audio over communication path 103. Audio can be digitized or interpreted by cognitive virtual assistant 104 into data 105. In one embodiment automated speech recognition (ASR) 120 can be performed at cognitive virtual assistant 104 or server 108 to digitally convert received audible speech into transcribed text. Cognitive virtual assistant 104 can utilize commercial technologies including, for example, Sentiment Analysis, Tone Analyzer, and Personality Insights to analyze data and adjust parameters of cognitive virtual assistant 104. Cognitive virtual assistant 104 can be implemented in a natural language conversational manner for receiving information from user 101 and automatically generating responses to user 101 during the conversation. Cognitive virtual assistant 104 can have cognitive learning abilities. Cognitive virtual assistant 104 can include natural language processing and context switching. Cognitive virtual assistant 104 can include semantic memory, episodic memory for learning from past conversations, analytic memory for understanding trend of data, and affective memory for understanding emotion and deep back projection networks (DBPN) for learning process flows via empirical learning. In some embodiments, the part of speech of content of the utterance of cognitive virtual assistant 104 is determined based on using a natural language parser (e.g., Stanford Natural Language Processing Group software or others as are known in the art) to parse the utterance. Virtual assistant 104 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The type of speech of content of the utterance can indicate if the content is a noun phrase, verb phrase, and/or theme. In some embodiments, the domain of the content of the utterance of cognitive virtual assistant 104 is determined based on pattern matching. Cognitive virtual assistant 104 can include components such as a processor, memory, storage, microphone, learning module, and operating system. An example, cognitive virtual assistant or virtual agent is described in U.S. Pat. No. 9,812,151 hereby incorporated by reference into this application.

Data 105 is transferred over communication path 107 to network 106. Network 106 communicates with system server 108. For example, network 106 can be the Internet. Cognitive virtual assistant 104 may include a server, computer, laptop, PC, mobile device, or the like that includes a processor, a memory, and a communication device. Cognitive virtual assistant 104 and system server 108 may include a plurality of computing devices connected together, e.g., via a network. The processor may include any general purpose or application-specific processor. The memory may include one or more tangible, non-transitory, machine-readable media.

System server 108 accesses third-party data interface 109. For example, third-party data interface 109 can be an interface to a third-party system for accessing third-party rate quote data. For example, system server 108 can access third-party data 115 directly from databases of third-party providers. In one embodiment, application programming interface (API) 110 of system server 108 or application programming interface (API) 111 of cognitive virtual assistant 104 communicates with application programming interface (API) 112 of third-party data interface 109 to access the features or data from third-party data interface 109. Alternatively, system server 108 can access third-party data 115 over network 106. For example, third-party data 115 can include third-party rate quoting services and carrier specific underwriting guidelines and requirements from multiple benefits providers.

System server 108 or cognitive virtual assistant 104 can connect to benefits interface 124. For example, benefits provider interface 124 can be an interface to one or more third-party systems for accessing underwriting requirements data 121. In one embodiment, application programming interface (API) 110 of system server 108 or application programming interface (API) 111 of cognitive virtual assistant 104 communicates with application programming interface (API) 122 of benefits provider interface 124 to access features or data from of benefits provider interface 124. Alternatively, system server 108 can access underwriting requirements data 121 over network 106. For example, underwriting requirements data 121 can include data fields of underwriting requirements relating to user information of medical records, laboratory results, prescribed medications, chronic conditions, family medical history and drug use.

System server 108 or cognitive virtual assistant 104 can connect to benefits provider application interface 130. For example, benefits provider application interface 130 can be an interface to one or more third-party systems for accessing application requirements data 131. In one embodiment, application programming interface (API) 110 of system server 108 or application programming interface (API) 111 of cognitive virtual assistant 104 communicates with application programming interface (API) 132 of third-party benefits provider application interface 130 to access the features or data from of benefits provider application interface 130. Alternatively, system server 108 can access application requirements data 131 over network 106. For example, application requirements data 131 can include data fields of the application relating to user information.

System server 108 or cognitive virtual assistant 104 can connect to third-party benefits provider enrollment interface 140. For example, third-party benefits provider enrollment interface 140 can be an interface to one or more third-party systems for accessing enrollment data 141. In one embodiment, application programming interface (API) 110 of system server 108 or application programming interface (API) 111 of cognitive virtual assistant 104 communicates with application programming interface (API) 142 of third-party benefits provider enrollment interface 140 to access the features or data from third-party benefits provider enrollment interface 140. Alternatively, system server 108 can access enrollment data 141 over network 106. For example, enrollment data 141 can include policy identification data and fulfillment data. In one embodiment, third-party benefits provider enrollment interface 140 can send enrollment data 141 directly to user 101 through user interface 102 by various methods of communication. Data 105, third-party data 115, underwriting requirements data 121, application requirements data 131 and enrollment data 141 can be stored in memory 150 of server 108. In one embodiment, API 110, API 111, API 112, API 122, API 132 and API 142 are web based APIs.

FIGS. 3A-3D are a flow diagram of an embodiment of interactive method 200 for interactively presenting benefits product customer services to a user. In step 211, a session with a cognitive virtual assistant is initiated through an interface shown in FIG. 3B. The user can be a buyer or consumer or system. For example, the user can initiate the session with the system using an interface of various methods of communication such as a phone, SMS, chat, mobile app, or Messenger. Once a session is initiated, in step 211, the user is introduced to a cognitive virtual assistant. The cognitive virtual assistant can greet and prompt the user to answer a series of preliminary questions regarding the requested services in step 212. In one embodiment, the system can internalize the user's answers and not repeat questions which limits buyer or consumer frustration. For a voice session, audio interfaces of the system allow multi-language, bi-directional, speech-based conversations between the cognitive virtual assistant and the user. As the user speaks to the cognitive virtual assistant, a process of automated speech recognition (ASR) can digitally convert received audible speech into transcribed text. Through natural language processing, including sentiment and tone analysis, the system evaluates the meaning and context of the transcribed text and adjusts the language and tone of responses from the cognitive virtual assistant accordingly to accommodate the user. The context-switching capability of the system allows the user to interrupt and restart any embedded process while retaining the user's information. The system's episodic memory allows the assistant to recall details from previous segments of the current conversation or previous conversations altogether. The cognitive virtual assistant can be implemented in a conversational manner for receiving information from a user and generating responses using cognitive learning abilities during the conversation. In one embodiment, the cognitive virtual assistant presents audio to the user and receives audio from the user. The cognitive virtual assistant is artificial intelligence based to receive voice via an audio interface which is transferred to a server to be interpreted with artificial intelligence. Responses from the server can be sent back via audio to the user's audio interface.

In step 213, during the session between the user and the cognitive virtual assistant, the system can adjust parameters of the cognitive virtual assistant to accommodate the user. For example, language and tone of the cognitive virtual assistant can be selected or adjusted. The cognitive virtual assistant can utilize commercial technologies including, for example, Sentiment Analysis, Tone Analyzer, and Personality Insights to adjust parameters of the cognitive virtual assistant.

In step 214, the cognitive virtual assistant engages in a conversation to prompt the user to provide information directed to an existing benefits product of which the user is currently a member. In one embodiment, the cognitive virtual assistant can request the following information from the user: name, date of birth, zip code and policy identification. In step 215, responses from the user are stored in memory of the system. Step 214 and step 215 can be repeated for collecting additional information from the user directed to desired coverage options.

In step 216, coverage information of one or more benefits products and services of one or more third-party benefits providers are identified and presented to the user. In one embodiment, the system can invoke an application programming interface (API) to call to one or more third-party benefits provider servers to obtain information directed to proof of coverage of the benefits product, coverage details, or to locate a provider. Responses from the one or more benefits provider servers can include, but not be limited to, plan descriptions, premiums and limitations. The cognitive virtual assistant can review the received responses and present the received responses or a subset of the received responses to the user by voice, text, or email at the user's preference.

Figure 3B:
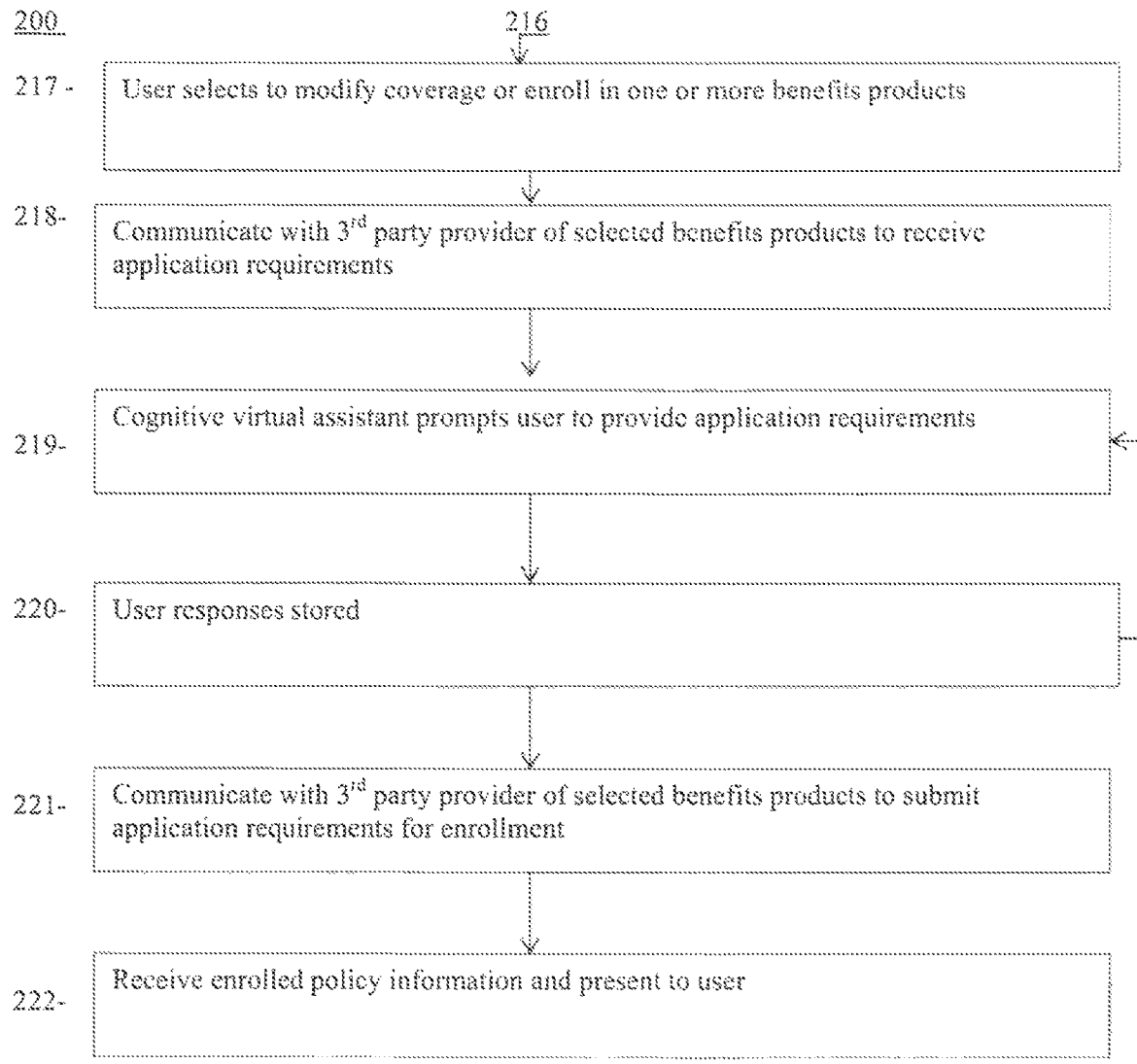

In step 217, the user can optionally select to modify existing benefits product coverage or to select one or more benefits products which can include plans for coverage options as shown in FIG. 3B. The one or more plans can be selected by the user specifying the one or more plan names or one or more unique identifiers to the cognitive virtual assistant. In step 218, if one or more benefits products are selected for enrollment, the system can communicate with one or more third-party benefits providers of one or more selected benefits products to receive coverage information or application requirements. In one embodiment, the system can invoke an application programming interface (API) call to one or more third-party benefits provider application servers to obtain application requirements for the selected coverage options.

In step 219, The cognitive virtual assistant prompts the user to provide information directed to the application requirements for the selected coverage option. In step 220, responses from the user can be stored in memory. Step 219 and step 220 can be repeated for collecting information from the user for each data field required on the application for the selected coverage option. The system can review the collected information to ensure that application requirements for the selected coverage options are satisfied. If the application requirements are not satisfied, steps 219 and 220 can be repeated.

In step 221, the system communicates with one or more third-party providers of selected benefits products to submit application requirements for enrollment. In one embodiment, the system invokes an application programming interface (API) to contact to one or more third-party benefits provider enrollment servers corresponding to the one or more third-party benefits provider application servers to submit the application and obtain a policy ID. In step 222, the system receives enrolled policy or plan information and presents the received information to the user. The response from the third-party benefits provider enrollment server can contain additional fulfillment material from the third-party benefits provider. The system can relay the additional fulfillment material to the user by various methods of communication, at the user's preference. The received policy information can be presented to the user by the cognitive virtual assistant.

Figure 3C:
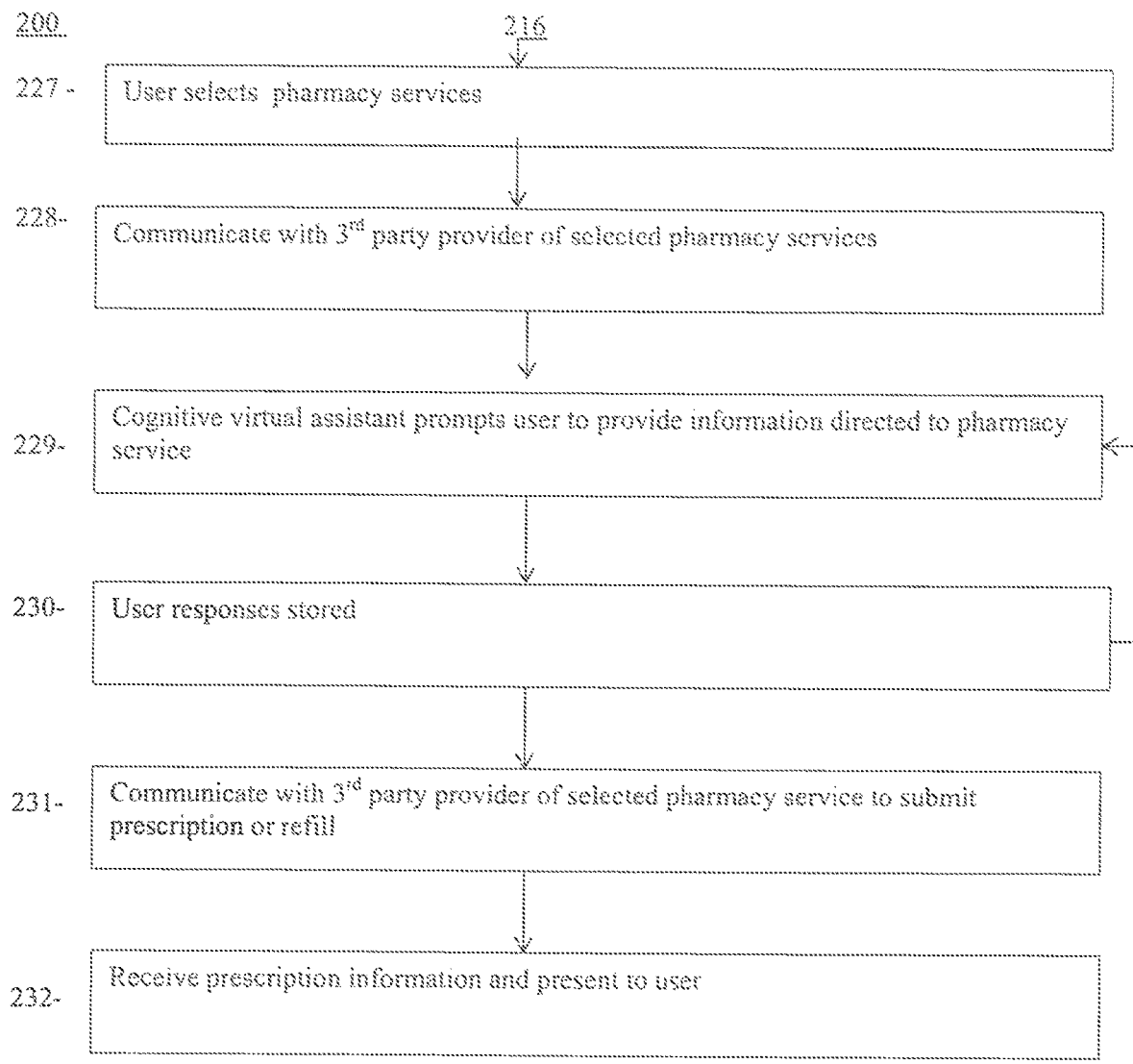
Figure 3D:
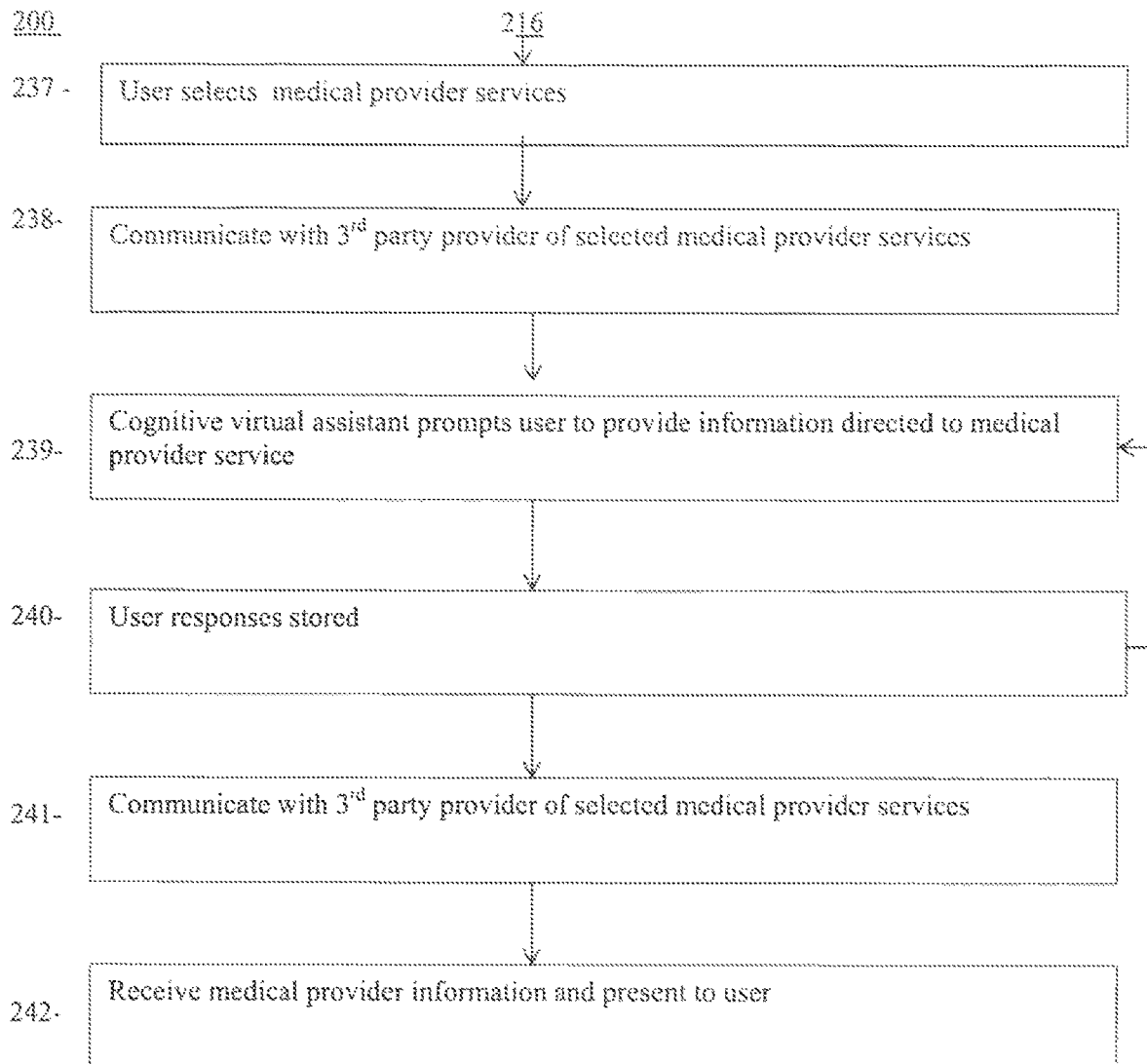

In step 227, the user can optionally select pharmacy services to be provided by a third-party pharmacy as shown in FIG. 3C. In step 228, if one or more pharmacies are selected, the system can communicate with one or more third-party pharmacies. In one embodiment, the system can invoke an application programming interface (API) to contact to one or more third-party pharmacy application servers to obtain pharmacy information.

In step 229, The cognitive virtual assistant prompts the user to provide information directed to the prescription to be filled or refilled. In step 230, responses from the user can be stored in memory. Step 229 and step 230 can be repeated for collecting information from the user for each data field required for a prescription. The system can review the collected information to ensure that prescription requirements for the selected prescription are satisfied. If the prescription requirements are not satisfied, steps 229 and 230 can be repeated.

In step 231, the system communicates with one or more third-party provider of pharmacy products or services to submit a prescription or refill. In one embodiment, the system invokes an application programming interface (API) to contact one or more third-party pharmacy servers to submit the prescription or refill. The system can also submit a request for reviewing or modifying payment details. In step 232, the system receives prescription information and presents the received information to the user. The system can relay the prescription information or payment information to the user by various methods of communication, at the user's preference. The received prescription information can be presented to the user by the cognitive virtual assistant.

In step 237, the user can optionally select medical provider services to be provided by a third-party medical provider as shown in FIG. 1D. In step 238, if one or more medical providers are selected, the system can communicate with one or more third-party medical providers. In one embodiment, the system can invoke an application programming interface (API) to contact to one or more third-party medical provider application servers to obtain medical provider information.

In step 239, The cognitive virtual assistant prompts the user to provide information directed to the medical condition or question. In step 240, responses from the user can be stored in memory. Step 239 and step 240 can be repeated for collecting information from the user for each data field required for a medical condition. The system can review the collected information to ensure that requirements for the diagnosing a medical condition selected are satisfied. If the requirements are not satisfied, steps 239 and 240 can be repeated. In addition, the system can determine if the condition is an emergency or non-emergency condition. If the condition is an emergency condition, the system can indicate that the user should contact 911 and not proceed with utilizing the system.

In step 241, the system communicates with one or more third-party providers of medical services. For example, the third-party provider of medical services can be an on-call physician, physician assistant, or nurse to provide information for non-emergency conditions. In one embodiment, the system invokes an application programming interface (API) to contact to one or more third-party medical provider servers to submit information. The system can also submit a request for reviewing or modifying payment details. In step 242, the system receives medical provider information and presents the received information to the user. The system can relay the medical provider information or payment information to the user by various methods of communication, at the user's preference. The received medical provider information can be presented to the user by the cognitive virtual assistant.

Figure 4:
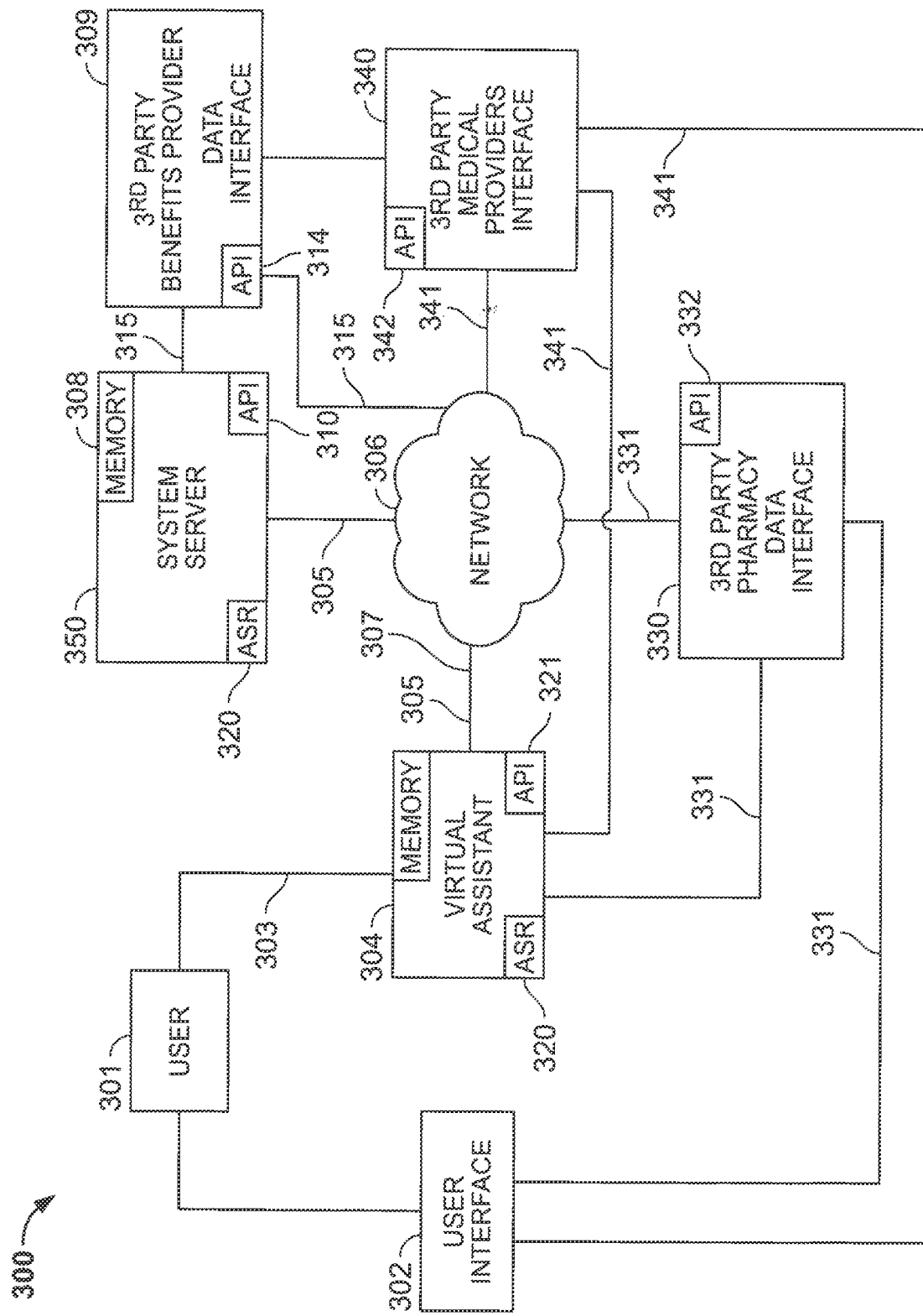
FIG. 4 is a block diagram of an embodiment of an artificial intelligence-based multi-channel system of the present invention for performing FIGS. 3A-3D.

FIG. 4 is a schematic diagram of an implementation of system 300. System 300 includes user interface 302 which is accessed by user 301. User interface 302 can be an electronic device such as a mobile telephony device including for example a mobile device, cell phone, smartphone, tablet, laptop or computer. User interface 302 can include SMS, chat, mobile app, or Messenger. Mobile telephony devices can communicate with fourth generation (4G) or fifth generation (5G) cellular communications. It will be appreciated that other mobile telephony devices and networks can be used in accordance with the teachings of the present invention. User interface 302 communicates audio or digital information to cognitive virtual assistant 304 over communication path 303.

Cognitive virtual assistant 304 is artificial intelligence based. In one embodiment, cognitive virtual assistant receives audio over communication path 303. Audio can be digitized or interpreted by cognitive virtual assistant 304 into data 305. In one embodiment automated speech recognition (ASR) 320 can be performed at cognitive virtual assistant 304 or system server 308 to digitally convert received audible speech into transcribed text. Cognitive virtual assistant 304 can utilize commercial technologies including for example Sentiment Analysis, Tone Analyzer, and Personality Insights to analyze data and adjust parameters of cognitive virtual assistant 304. cognitive virtual assistant 304 can be implemented in a natural language conversational manner for receiving information from user 301 and automatically generating responses to user 301 during the conversation. Cognitive virtual assistant 304 can have cognitive learning abilities. Cognitive virtual assistant 304 can include natural language processing and context switching. Cognitive virtual assistant 304 can include semantic memory, episodic memory for learning from past conversations, analytic memory for understanding trend of data, affective memory for understanding emotion, and deep back projection networks (DBPN) for learning process flows via empirical learning. In some embodiments, the part of speech of content of the utterance of cognitive virtual assistant 304 is determined based on using a natural language parser (e.g., Stanford Natural Language Processing Group software or others as are known in the art) to parse the utterance. The part of speech of content of the utterance can indicate if the content is a noun phrase, verb phrase, and/or theme.

In some embodiments, the type of speech of content of the utterance of cognitive virtual assistant 304 is determined based on using a natural language parser (e.g., Stanford Natural Language Processing Group software or others as are known in the art) to parse the utterance. Cognitive virtual assistant 304 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The type of speech of content of the utterance can indicate if the content is a noun phrase, verb phrase, and/or theme. In some embodiments, the domain of the content of the utterance of cognitive virtual assistant 304 is determined based on pattern matching. Cognitive virtual assistant 304 can include components such as a processor, memory, storage, microphone, learning module, and operating system. An example, cognitive virtual assistant or virtual producer is described in U.S. Pat. No. 9,812,151 hereby incorporated by reference into this application. Cognitive virtual assistant 304 may include a server, computer, laptop, PC, mobile device, or the like that includes a processor, a memory, and a communication device. Cognitive virtual assistant 304 and system server 308 may include a plurality of computing devices connected together, e.g., via a network. The processor may include any general purpose or application-specific processor. The memory may include one or more tangible, non-transitory, machine-readable media.

Data 305 is transferred over communication path 307 to network 306. Network 306 communicates with system server 308. For example, network 306 can be the Internet.

System server 308 accesses third-party benefits provider data interface 309. For example, third-party benefits provider data interface 309 can be an interface to a third-party benefits provider system. For example, system server 308 can access third-party benefits provider data 315 directly from databases of third-party providers. In one embodiment, application programming interface (API) 310 of system server 308 or application programming interface (API) 311 of cognitive virtual assistant 304 communicates with application programming interface (API) 312 of third-party benefits provider data interface 309 to access the features or data from third-party benefits provider data interface 309. Alternatively, system server 308 can access third-party benefits provider data 315 over network 306. For example, third-party benefits provider data 315 can include third-party rate coverage and premium data from multiple benefits providers.

System server 308 or cognitive virtual assistant 304 can connect to third-party pharmacy data interface 330. For example, third-party pharmacy data interface 330 can be an interface to a third-party system for accessing pharmacy data 331. In one embodiment, application programming interface (API) 310 of system server 308 or application programming interface (API) 311 of cognitive virtual assistant 304 communicates with application programming interface (API) 332 of third-party pharmacy data interface 330 to access the features or data from third-party pharmacy data interface 330. Alternatively, server 308 can access pharmacy data 331 over network 306. For example, pharmacy data 331 can include data fields of prescription or refill relating to user information. In one embodiment, pharmacy data 331 can be accessed from or sent directly to user interface 301. In one embodiment, pharmacy data interface 330 can send pharmacy data 331 directly to user 301 through user interface 302 by voice, text or email.

System server 308 or cognitive virtual assistant 304 can connect to third-party medical provider interface 340. For example, third-party medical provider interface 340 can be an interface to a third-party system for accessing medical provider data 341. In one embodiment, application programming interface (API) 310 of system server 308 or application programming interface (API) 311 of cognitive virtual assistant 304 communicates with application programming interface (API) 342 of third party medical provider interface 340 to access the features or data from third-party medical provider interface 340. Alternatively, system server 308 can access medical provider data 341 over network 306. For example, medical provider data 341 can include medical condition diagnosis and treatment data. In one embodiment, third-party medical provider interface 340 can send medical provider data 341 directly to user 301 through user interface 302 by voice, text or email. Data 305, third-party data 315, pharmacy data 331 and medical provider data 341 can be stored in memory 350 of system server 308.

Embodiments of the present invention can be implemented in connection with a special purpose or general purpose computer device that includes both hardware and/or software components, including special purpose or general purpose computers.

Embodiments can also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer-implemented method for enrolling a user using an identified agent offering identified benefits products comprising the steps of:

providing a user interface to a cognitive virtual assistant, the cognitive virtual assistant receives audio from the user interface which is interpreted with artificial intelligence at a processor to generate data and audio responses, the audio responses being forwarded to the user interface;

the cognitive virtual assistant prompting a user for underwriter requirements information for one or more a benefits products which are of interest to the user for purchase, the cognitive virtual assistant determining eligibility of the user for the one or more benefits products from responses for underwriting requirements received by the cognitive virtual assistant and presenting relevant one or more benefits products to the user;
the virtual assistant scanning a network of live agents in a resident state of the user to identify the agent offering the relevant one or more benefits products;
    presenting application requirements of the relevant one or more benefits products to the user using the cognitive virtual assistant in real time;
    the user, completing the application requirements using the cognitive virtual assistant; and
    communicating the completed application requirements to the agent for forwarding to a respective one or more benefits providers for enrollment.

2. The method of claim 1 wherein the step of prompting a user for information includes prompting the user to answer one or more pre-qualifying questions and the identification of the one or more benefits products being determined from eligibility of the user based on answers to the one or more pre-qualifying questions.

3. The method of claim 1 further comprising adjusting parameters of the cognitive virtual assistant to accommodate the user.

4. The method of claim 1 further comprising the step of receiving enrolled policy information after enrollment and presenting the enrolled policy information to the user with the cognitive virtual assistant.

5. The method of claim 1 further comprising the step of evaluating a level of intent or urgency of the user to purchase the one or more benefits products by using the description given by the user to the cognitive virtual assistant.

6. A computer implemented system for enrolling a user using an identified agent offering identified benefits products comprising:
    a user interface communicating with a cognitive virtual assistant, and the cognitive virtual assistant receives audio from the user interface which is interpreted with artificial intelligence at a processor to generate data and audio responses, the audio responses being forwarded to the user interface;
    a server communicating over a network to the cognitive virtual assistant; and
    a benefits providers interface, benefits providers application interface and benefits provider enrollment interface communicating with the cognitive virtual assistant,
    wherein the cognitive virtual assistant prompts a user for underwriter requirements information for one or more benefits products which are of interest to the user for purchase, the server communicates the underwriter requirements information to one or more benefits providers by scanning a network of live agents in a resident state of the user to identify the agent offering the one or more benefits products which are of interest to the user for purchase and were presented to the user by the virtual assistant using the benefits providers interface and receives application requirements from the one or more benefits providers using the benefits providers application interface, presents the application requirements to the user with the cognitive virtual assistant in real time, receives completed application requirements from the cognitive virtual assistant, forwards the completed application requirements to the benefits provider enrollment interface and presents enrolled policy information to the user with the cognitive virtual assistant.

7. The system of claim 6 wherein the user interface is an electronic device of a mobile device, cell phone or smart phone.

8. The system of claim 6 wherein the virtual assistant has cognitive learning abilities.

9. The system of claim 6 wherein the cognitive virtual assistant is determined based on a natural language parser.

10. The system of claim 6 wherein parameters of the cognitive virtual assistant are adjusted to accommodate the user.

11. The system of claim 6 wherein the server evaluates a level of intent or urgency of the user to purchase the one or more benefits products by using the description given by the user to the cognitive virtual assistant.

12. The system of claim 6 wherein a API on the server or the cognitive virtual assistant is activated to establish a connection with a API of the benefits providers interface.

13. The system of claim 6 wherein a API on the server or the cognitive virtual assistant is activated to establish a connection with a API of the benefits providers application interface.

14. The system of claim 6 wherein a API on the server or the cognitive virtual assistant is activated to establish a connection with a API of the benefits provider enrollment interface.

15. A non-transitory computer-readable medium having stored thereon a plurality of sequences of instructions, said instructions including sequences of instructions which, when executed by at least one processor, cause said processor to receive audio from a user interface in communication with a cognitive virtual assistant, and the cognitive virtual assistant receives the audio from the user interface, the audio is interpreted with artificial intelligence at a processor to generate data and audio responses, the audio responses being forwarded to the user interface; the cognitive virtual assistant communicating with a benefits providers interface, benefits application interface and benefits enrollment interface,
    wherein the cognitive virtual assistant prompts a user for underwriter requirements information for one or more benefits products which are of interest to the user for purchase, the processor communicates the underwriter requirements information to one or more benefits providers by scanning a network of live agents in a resident state of the user to identify the agent offering the one or more benefits products which are of interest to the user for purchase and were presented to the user by the cognitive virtual assistant using the benefits providers interface and receives application requirements from the one or more benefits providers using the benefits providers application interface, presents the application requirements to the user with the cognitive virtual assistant in real time, receives completed application requirements from the cognitive virtual assistant, forwards the completed application requirements to the benefits provider enrollment interface and presents enrolled policy information to the user with the cognitive virtual assistant.

16. The non-transitory computer-readable medium of claim 15 wherein the processor further evaluates a level of intent or urgency of the user to purchase the one or more benefits products by using the description given by the user to the cognitive virtual assistant.

17. The non-transitory computer-readable medium of claim 15 wherein a API of the cognitive virtual assistant is activated to establish a connection with a API of the benefits providers interface, API of the benefits application interface or a API of the benefits enrollment interface.

* * * * *